Oct. 31, 1967  H. FRIEDENREICH ET AL  3,350,119
DETACHABLE CONNECTION OF A PISTON WITH A PISTON ROD, ESPECIALLY
FOR A PISTON COMPRESSOR
Filed Aug. 27, 1964
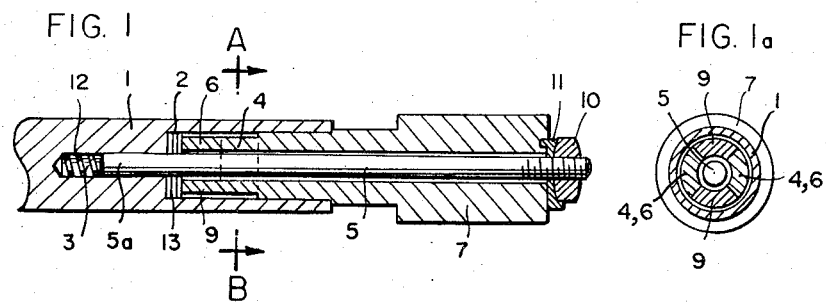
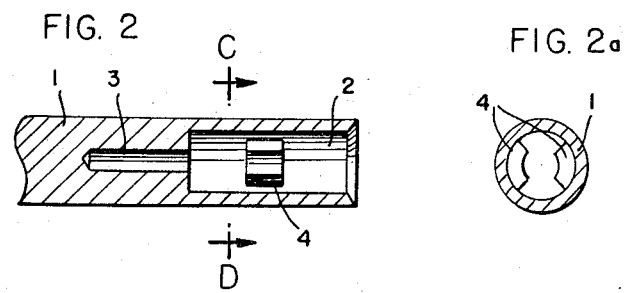
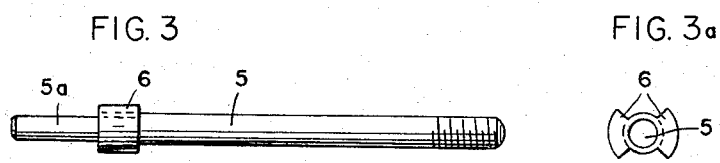
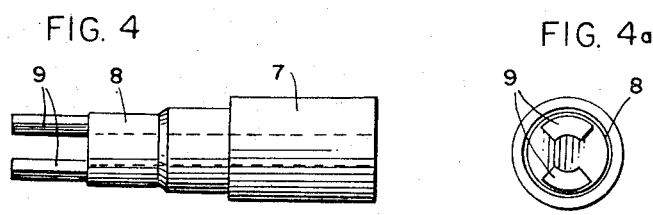
INVENTORS:
HEINRICH FRIEDENREICH
KURT ERDMANN
BY: Marzall, Johnston, Cook & Root
ATT'YS

United States Patent Office 3,350,119
Patented Oct. 31, 1967

3,350,119
DETACHABLE CONNECTION OF A PISTON WITH A PISTON ROD, ESPECIALLY FOR A PISTON COMPRESSOR
Heinrich Friedenreich, Limburgerhof, Pfalz, and Kurt Erdmann, Wesseling, Germany, assignors to Badische Anilin- & Soda-Fabrik Aktiengesellschaft, Ludwigshafen (Rhine), Germany
Filed Aug. 27, 1964, Ser. No. 392,530
Claims priority, application Germany, Aug. 29, 1963, B 73,304
4 Claims. (Cl. 287—53)

This invention relates in general to piston compressors and particularly to a detachable rigid connection between piston and piston rod.

The design in one or two parts of the piston (connected via a crosshead to the crank) with the associated piston rod of the piston engine is already known. In the two-part design, the piston and the piston rod have hitherto usually been connected together by a screwthread. In assembling large piston engines, the piston is usually screwed onto the piston rod in the workshop, secured by a pin or screw and then inserted into the cylinder at the place of installation of the engine and secured to the crosshead. On the other hand, occasional or regular exchange of the sealing elements of the piston, for example piston rings, usually takes place at the engine, after removal of the cylinder head. In the prior art designs, the piston rod must be detached from the crosshead so that the piston may be drawn out from the cylinder. In the case of heavy-duty piston compressors, particularly gas compressors for very high pressures, having special and sensitive piston packing, however, it is desirable for the adjustment of the packing elements of the piston to be carried out in an adequately equipped workshop and not at the engine itself. It is however very time-consuming and, having regard to the relatively great weight of the parts to be dismantled, too expensive to separate the piston together with the piston rod from the crosshead and convey it to the workshop.

We have now found a detachable connection of the piston with the piston rod which makes it possible, after removal of the cylinder head, to detach only the piston direct from the piston rod without the need for uncoupling the piston rod from the crosshead. The connection is such that movement of the piston in relation to the piston rod during operation is impossible. The connection according to this invention comprises a piston rod provided axially and concentrically at its forward or piston end with bores having different diameters, the larger cylindrical cavity being provided with one or more lugs on its inner wall and the smaller cylindrical cavity being adapted to receive the rear end of a shank pushed past the lugs, said shank having one or more bosses equivalent in shape to the lugs which, when the shank is turned, engage behind the lugs, and also comprises a bored piston having a cylindrical extension adapted to the diameter of the cavity in the piston rod and bearing one or more projections extending in axial direction which, when the piston is pushed on and fixed on the shank enter into the recesses left free between the lugs and the bosses lying behind the same.

The invention will now be described in greater detail with reference to one embodiment shown in the drawing. FIGURE 1 is an axial sectional view of the detachable connection of the piston with the piston rod; FIGURE 1a is a section on the line A–B of FIGURE 1; FIGURE 2 is an axial section of the end of the piston rod; FIGURE 2a is a section on the line C–D of FIGURE 2; FIGURE 3 is a side elevation of the shank; FIGURE 3a is an end elevation of the shank; FIGURE 4 is a side elevation of the piston and FIGURE 4a is an end view of the piston viewed from the left in FIGURE 4.

The end of the piston rod 1 facing the piston is provided with two concentric axial bores having different diameters so that a step is formed between the two cavities. There are thus provided an outer cylindrical cavity 2 having the larger internal diameter and, nearer to the crosshead, another cavity 3 of smaller diameter, preferably also cylindrical. Two lugs 4 are provided on the wall of the cavity 2 and are located at about half the depth of this cavity. These lugs 4 have a length which is about one third of the depth of the cavity 2 and they are shaped in section as sectors of a circle. The angle of the sector in the embodiment shown is about 90°. Towards the axis, the lugs 4 are bounded by parts of a cylindrical surface corresponding in diameter to a shank 5, formed as a cylindrical rod, onto which the bored piston may be pushed. One end 5a of the shank 5 is preferably made a sliding fit in the cavity 3 of the piston rod 1. Two bosses 6 are provided on the outer surface of the shank 5, the cross-section of these bosses being about equivalent to that of the lugs 4 in the cylindrical cavity 2. The end 5a of the shank 5 is pushed into the cavity 3, so that the bosses 6 pass through the gaps between the lugs 4, and the shank is then twisted through 90° so that the bosses lie behind the lugs 4 and are coincident with them, i.e. the bosses 6 and lugs are then in axial and radial alignment so that the shank 5 is interlocked against axial movement.

In assembling the detachable connection, after first inserting the shank 5 and twisting it through 90° as described above, the bored piston 7 may be pushed over the end of the shank 5 to engage with the piston rod 1 in the assembled position shown in FIG. 1. To prevent the piston 7 from turning in relation to the piston rod 1, the piston 7 is provided at the end facing the crosshead with an extension 8 which is a sliding fit in the cavity 2 and which reaches to the lugs 4. The cylindrical extension 8 bears two projections or tenons 9 having sector shaped cross-sections which as the piston is pushed onto the shank pass into the space between the two lugs 4 and the space between the two bosses 6 and completely bridge these spaces to prevent rotational movement of the piston 7. The piston thus slides only axially into place and is not rotatably fitted onto the piston rod 1, although it is free to rotate during its insertion so as to locate and position the tenons 9 in the free annularly segmented spaces remaining around the shank 5 and unoccupied by the lugs 4 and bosses 6 in their assembled position within the cavity or bore 2. This assembled fitting of the lugs 4, bosses 6 and piston tenons 9 can be readily seen by superimposing FIG. 3a onto FIG. 2a and these in turn onto FIG. 4a so as to give the cross-sectional view of the assembled parts in the direction of the arrows A–B as shown in FIG. 1a. After the parts have been assembled as described, the piston is tightened against the piston rod 1 by means of a nut 10 placed onto a screwthread at the exposed end of the shank 5 and secured thereto in a conventional manner, for example by means of a deformable metal sheet 11. This secured nut in combination with the threaded exposed extension of the shank 5 provides a locking means to connect the piston 7 at its forward end to the shank and thereby firmly hold the piston axially against the piston rod 1. A spring 12 may be provided between the end 5a of the shank 5 and the bottom of the cavity 3 so that the lugs 4 on the piston rod 1 exert a certain pressure against the bosses 6 on the shank 5 and the assembly of the connection is facilitated. A seal 13 is provided between the shank 5, the piston 7 and the piston rod 1. Obviously it is possible, instead of making the lugs 4 sector-shaped and the bosses 6 of equivalent shape, to make the members providing the secure connection of other geometric shape. Moreover, the detachable connection may be made by only one lug and only one boss, instead of with two or more lugs 4 and an equal number of bosses 6.

We claim:

1. A piston and piston rod assembly providing a detachable rigid connection therebetween, especially in a high pressure compressor, said assembly comprising in combination:

a piston rod having an axially concentric bore at one end thereof, said bore being longitudinally divided into two portions of different diameters, and at least one radially inwardly projecting lug on an annular portion of the inner wall of the bore of greater diameter at a point intermediate the ends thereof;

a cylindrical shank having one end inserted for both axial and rotational movement within the concentric bore of smaller diameter of said piston rod, said shank bearing at least one radially outwardly projecting boss corresponding in annular cross section to said lug of said piston rod and located in engagement behind said lug within said bore of greater diameter in the locked position of said assembly;

a piston having an axial and concentric bore corresponding to the diameter of said shank and also having a rearward extension inserted axially into said bore of greater diameter of said piston rod, said rearward extension including at least one tenon fitted axially into at least a portion of the free annular space which remains around said shank and which is unoccupied by the engaged lug and boss members in their locked position so as to prevent rotational movement of said piston carried on said shank; and locking means connecting said piston at its forward end to said shank to firmly hold the piston axially against said piston rod.

2. The piston and piston rod assembly as claimed in claim 1 wherein said bore of smaller diameter contains a spring adapted to exert pressure axially forwardly on said shank in its assembled position.

3. The piston and piston rod assembly as claimed in claim 1 wherein sealing means are provided between said shank and said piston.

4. The piston and piston rod assembly as claimed in claim 1 wherein said lugs and bosses are shaped as sectors of a circle to form annular segments in axial and radial alignment with each other in their assembled position.

References Cited

UNITED STATES PATENTS

| | | | |
|---|---|---|---|
| 1,171,380 | 2/1916 | Arthur | 287—103 |
| 1,332,898 | 3/1929 | Hossie et al. | 287—103 |
| 2,708,144 | 5/1955 | Carr | 287—20 |

CARL W. TOMLIN, *Primary Examiner.*

A. V. KUNDRAT, *Assistant Examiner.*